Dec. 12, 1967  R. EVRARD  3,357,254
PRESSURE MEASURING DEVICE
Filed April 5, 1965  3 Sheets-Sheet 1

INVENTOR
ROBERT EVRARD
BY
AGENT

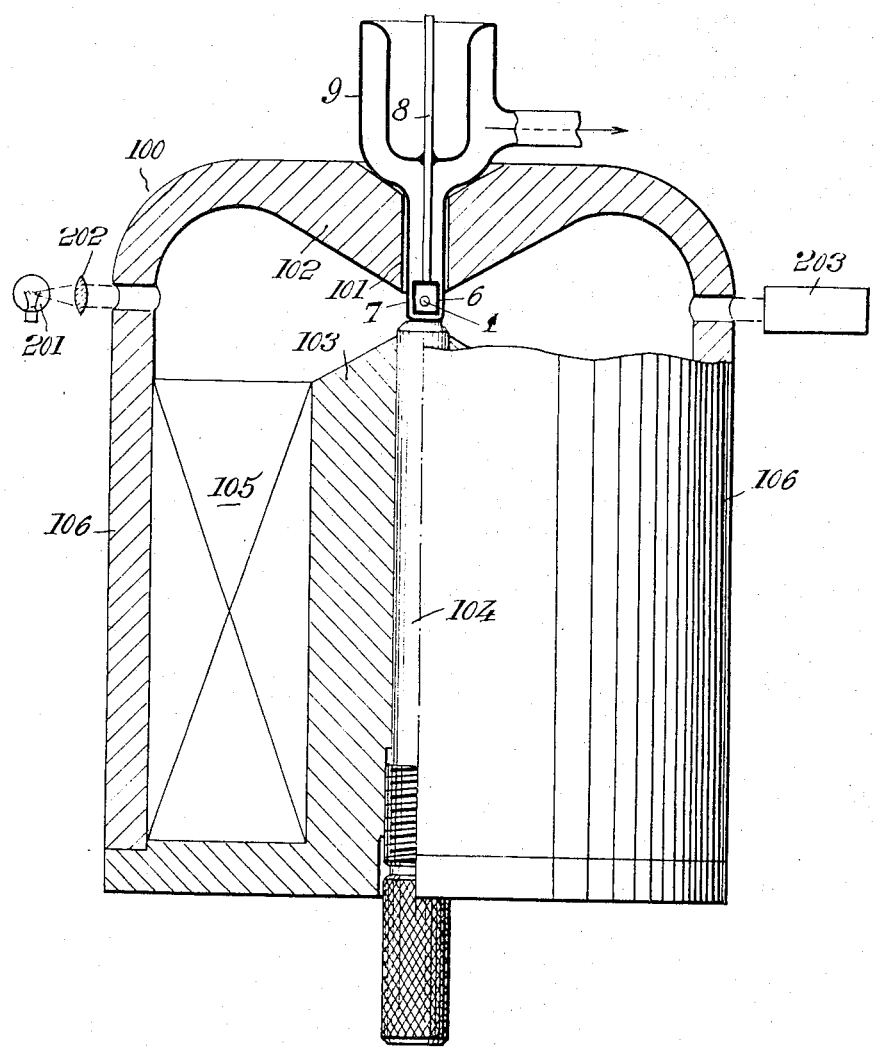

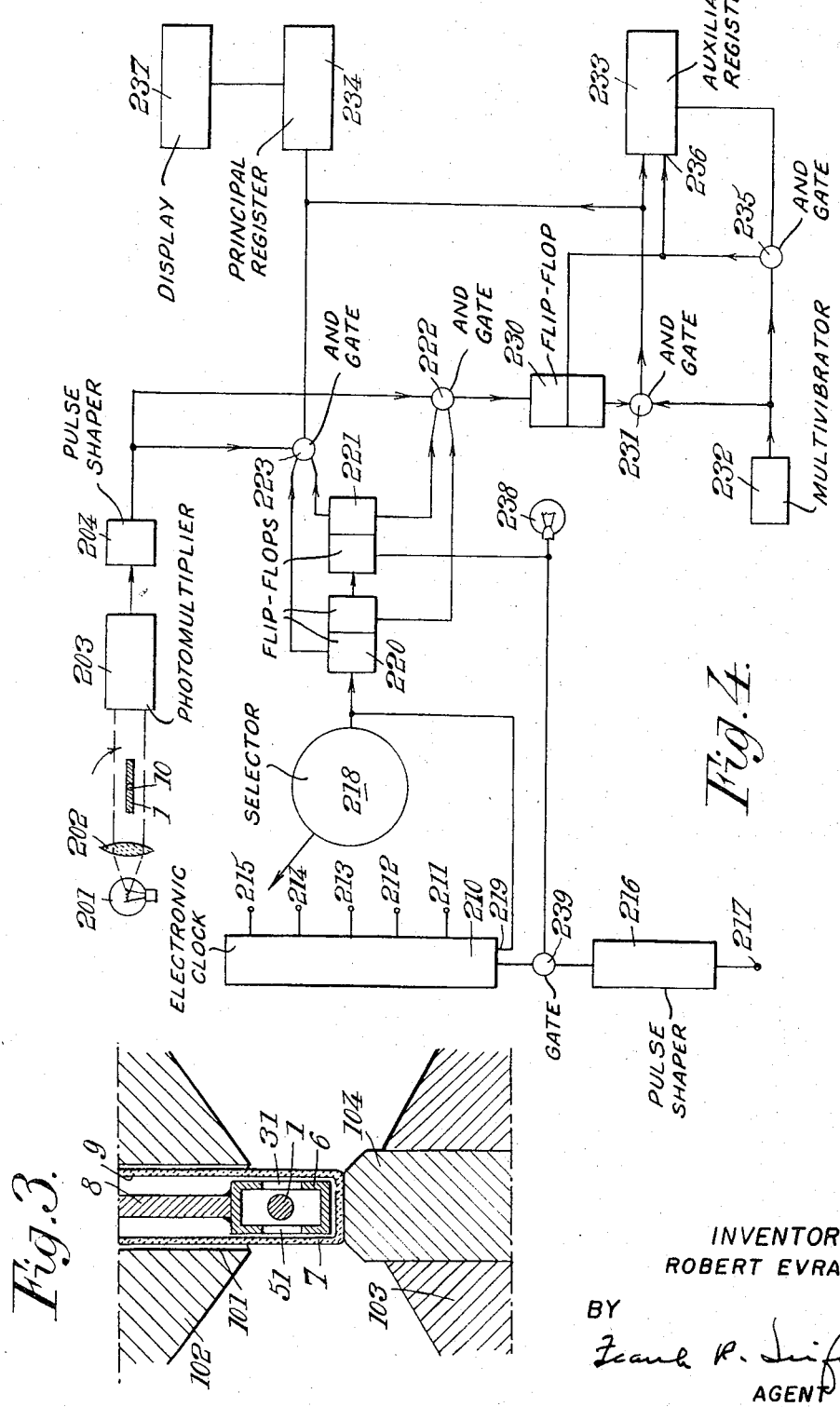

United States Patent Office 3,357,254
Patented Dec. 12, 1967

3,357,254
PRESSURE MEASURING DEVICE
Robert Evrard, Champigny-sur-Marne, France, assignor to Laboratoires d'Electronique et de Physique Appliquees L.E.P., Paris, France
Filed Apr. 5, 1965, Ser. No. 445,566
Claims priority, application France, Apr. 9, 1964, 970,310
6 Claims. (Cl. 73—398)

ABSTRACT OF THE DISCLOSURE

An ultra-high vacuum pressure gauge employing a gauge tube, surrounded by the upper part of an electromagnet, which encloses a thin graphite disc magnetically suspended (by levitation) and spinning freely in a cooled copper cylinder. "Warm" molecules, coming from the glass tube at room temperature, enter the cylinder through vertical slits and strike two half-faces of the disc, giving rise to a torque linearly dependent on the molecular pressure. Auxiliary slits, filled with silicon, homogenize the illumination of the disc, thus cancelling the parasitic torque of radiation pressure.

---

This invention relates to improvements in devices for measuring low pressures, such devices being called "thermomolecular" gauges. Such gauges comprise, inside the envelope within which the pressure is to be measured, a movable element which is rotatable about an axis of symmetry and is subjected to a mechanical torque due to the impact, on a part of its area of molecules accelerated by impact on a fixed hot surface. The intensity of this torque provides a measure of the pressure.

For obtaining such a torque, it is known to place the movable element at the center of a cylindrical screen which is thick and is provided with regularly spaced and orientated apertures, the hot source being external to such screen. The latter only passes molecules having a trajectory which is favourable to the production of the desired torque corresponding to a given direction of rotation of the movable element. This couple is thus a direct function of the pressure.

Such gauges are more or less related with radiometer gauges. In the latter there is also a rotatable element, parts of the surface of which being blackened, the other parts being polished. The blackened surfaces thereof are heated more by ambient radiation than the polished surfaces and the molecules of gas rebound more energetically and consequently with greater velocity from the hotter surfaces than from the colder ones. A torque is thus created, and provides a measure of the gas pressure, which can not be low.

Thermomolecular gauges are quite different; the characteristics of all the surface of the rotatable element may be identical. Some of the gas molecules are also accelerated by impact on a hot surface, but this hot surface is fixed. The pressure has to be low enough (below $10^{-2}$ mm. Hg) to give straight trajectories to the gas molecules, that is to say that the mean free path of the molecules has to be greater than the distance from the hot surface to the rotatable element. In such conditions, the difference of velocity between the molecules which have just been accelerated by impact on the hot surface, and the other ones, can create on the rotatable element a torque providing a measure of the pressure.

For obtaining such torque, it is known to place the movable element at the center of a cylindrical cold screen which is thick and is provided with regularly spaced and orientated apertures, the hot source being external to such a screen. The latter only lets go the molecules having a trajectory which is favorable to the production of the desired torque corresponding to a given direction of rotation of the movable element: this torque is thus a direct function of the pressure.

It has been found that the field of application of such gauges is restricted. At the very low pressures, i.e. below about $10^{-8}$ torr, the torque does not appear to depend any longer on pressure.

It is an object of the invention to extend the field of application of gauges of the type described to very low pressures.

It is another object of the invention to improve the accuracy of such gauges.

It is yet another object to render the use of such gauges more convenient.

The present invention provides a device for measuring low gas pressures comprising a movable element which is rotatable about an axis of symmetry and is located inside a screen constituted by an assembly of parts separated by apertures. The device comprises also a fixed hot source constituted by at least one fixed hot surface external to the screen. The parts are arranged in relation to the source in such manner as to intercept principally those straight lines directed from the source to the element, in relation to which the said axis of symmetry lies on a given side. These parts have windows which are constituted by a material transparent to infra-red rays and are disposed in relation to the source in such manner as to intercept principally those straight lines in relation to which the said axis of symmetry lies on the said given side.

The invention is based on the concept that the hot source emits infra-red rays which are selected by the apertures in the screen in the same way as the gas molecules of the known arrangements, and the radiation pressure of said rays on the movable element is thus converted into a parasitic torque which has the same sense as the desired torque but is independent of pressure. It is the relative increase of this parasitic torque with diminishing pressure which, according to this concept, extends the lower limit of the pressures which can be measured.

According to the invention, the parasitic torque due to the infra-red rays emitted by the hot source through said apertures is compensated by the torque due to the infrared rays arriving from the same source through said windows. This means that these windows homogenize infra-red illumination on the rotatable element, and so cancel the parasitic torque of radiation pressure. It should be noted that this compensation does not depend on the intensity of the radiation emitted by the hot source since, for each increase in the radiation through the apertures, there is a corresponding proportional increase in the radiation through the windows. Other features of the invention will appear from the following description which relates to an embodiment given by way of example with reference to the accompanying drawings in which corresponding elements have been given the same reference numerals.

FIGURE 2 represents, on a smaller scale, an elevation of a gauge comprising said screen, the figure being in part sectioned on an axial plane.

FIGURE 3 is only an enlargement of a part of FIGURE 2.

FIGURE 4 is a block-schematic diagram of the electronic measuring means.

Figure 1:
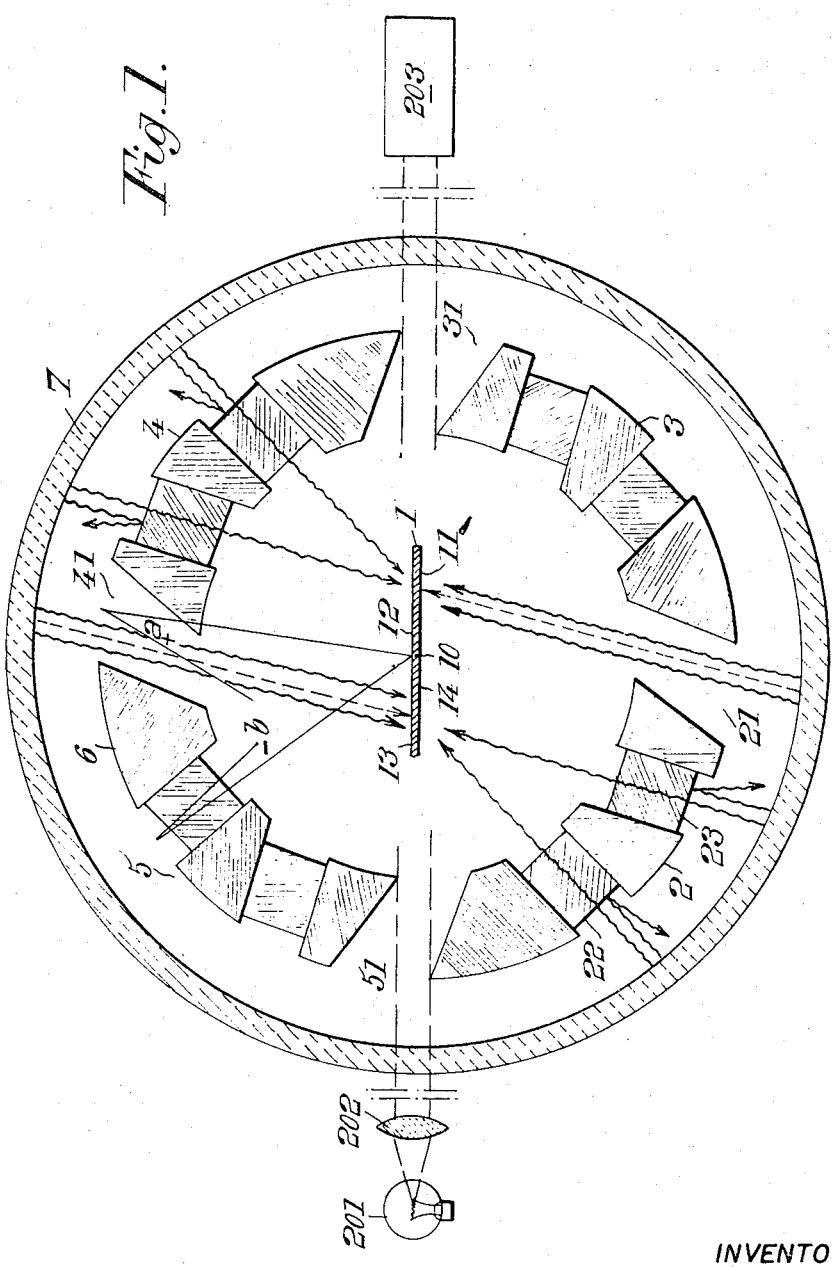
FIGURE 1 represents a cross section of a cylindrical screen in accordance with the invention.

In FIGURE 1 the movable element is represented at 1. It is free to revolve round its vertical axis of symmetry 10 which is normal to the plane of the drawing. The intercepting screen is made of copper and comprises four parts in the example shown: 2, 3, 4, 5. It is formed from a cylinder 6 having a thickness of 0.6 mm. and pierced by four apertures 21, 31, 41, 51. It is arranged co-axially with the movable element 1 between the latter and an external hot source 7. The screen and the apertures present a symmetry of the fourth order around the axis 10, i.e., the geometrical figure which they form coincides with itself after a 90° rotation around the said axis. The median plane of the apertures forms, with the radial plane passing through the same generatrix of the cylinder and the axis of symmetry, an acute angel indicated at *a*. The apertures which are effective for a given position of the movable element 1 (the apertures 21, 41 in the example shown) are diametrically opposed and the zones of impact (on the movable element 1) of the molecules passed by the effective apertures are situated on two symmetrical half-faces of the movable elements (11 and 13 in the example shown). The bundles or beams of molecules accelerated from the hot source 7 are represented by the dotted lines which traverse the effective apertures. It will be seen that the axis 10 lies to the left of said beams, while the beams of molecules in relation to which the axis 10 would be to the right have been intercepted by parts 2 and 4.

The hot source 7 emits equally infra-red radiation which is represented by wavy lines, one part of which radiation is transmitted by apertures 21, 31, 41, 51. The radiation pressure of this on the faces 11 and 13 is converted into a parasitic torque on the element 1 and restricts the lower limit of the measurable pressures. In accordance with the invention each screen part is provided with windows (two in the present example, e.g., 22 and 23 for the screen part 2) closed by a thick bar of silicon, which is a material which transmits infra-red. The median plane of each of these windows forms with the radial plane passing through the same generatrix of the cylinder and the axis 10, an acute angle indicated at *b* and having a sign opposite to the sign of the angle *a* previously defined. For a given position of the movable element the zones of impact of the effective infra-red radiation pasisng through said windows are the half-faces 12 and 14 which are not reached by the fast molecules, the axis 10 being always to the right of said rays. Their pressure of radiation is converted into a couple which compensates for the torque created by the infra-red rays passing through apertures such as 51 and 31.

The number and the dimensions of the windows are chosen in relation to the material by which they are constituted. Roughly one can say that if said material transmits, for example, 50% of the received infra-red radiation, two windows of the same areas as the apertures are needed. This is substantially the case with silicon. It should be pointed out nevertheless that, in accordance with what is shown in the drawing, the proportion of 50% results more from reflection of the rays from the surfaces of the windows than from absorption of said rays by the material. The proportion of transmitted radiation could thus be greatly increased by surface treatment. In practice, the improvement in the performance of the gauge obtained when each screen part is provided with the two windows shown and formed by bars of untreated silicon of a size determined by trial and error (one could use, as well, germanium) lowers the limit of measurable pressures by a factor of at least 10. It should also be noted that, if a material were available which could transmit prefectly all the unwanted infra-red rays, it would be sufficient to make the screen completely out of such material to obtain a theoretically perfect compensation. In practice the solution shown has been found better but the choice may depend on economic factors, for example the cost of treatment of the surface of the silicon.

The movable element 1 is a disc having a thickness of 0.1 mm. and 3 mm. in diameter, made of graphite. This material has been chosen because it is diamagnetic and its magnetic susceptibility is large, as is required for the method of suspension (known as "levitation") which will now be described.

In FIGURE 2 it will be seen that the disc 1 is magnetically suspended in the air gap of the electro-magnet 100. A bore 101 having a diameter of 12 mms. (slightly greater than that of the gauge) is formed in the upper pole-piece 102 of the electro-magnet. The two pole-pieces 102 and 103 are frusto-conical and the assembly has symmetry of revolution with respect to the vertical axis 10 taken as a reference axis.

The provision of the bore 101 permits the setting up, within the air gap, of a diverging magnetic field having rotational symmetry in which the disc 1 is placed vertically and remains suspended without any mechanical contact. It is desirable for this field to be adjustable. For this purpose the pole-piece 103 has a central bore which is screw-threaded and is engaged by an adjustable element 104 of ferro-magnetic material which is screwed into it and permits modification of the form of the lines of force of the field.

The field intensity needed is of the order of 15,000 oe. It is for limiting this intensity that it is preferable to use materials having large magnetic susceptibility.

In these conditions the disc 1 can revolve freely around its vertical diameter.

Nevertheless, since the symmetry of the field is imperfect, there are restoring torques under the effect of which, at rest, the disc tends to orientate itself along certain preferred directions. However, when the disc turns, the effects of these restoring torques cancel out over a whole number of complete revolutions, and the said disc turns very smoothly. The disc form given to the element 1 readily permits the axis of symmetry of the field to coincide with an axis of symmetry of the movable element (i.e., a diameter of the disc). The electro-magnet 100 is energized by coil 105 and the magnetic circuit is closed externally by the thick cylindrical wall 106. The height of the electromagnet 100 is, e.g., 19 cm. and its diameter is, e.g., 16 cm.

FIGURE 3 shows, in addition to the pole-pieces 102 and 103, the glass tube 7 already shown in FIGURE 1. It fulfills, effectively, both the function of an air tight envelope (within which prevails the pressure which is to be measured) and that of a hot source since, in the example described, such source is not heated artificially. Its temperature is that of the room. It is hot as compared with the cylinder 6 which is artificially cooled by stem 8 which is a good heat conductor. The cylinder 6 is sufficiently thick, and the copper of which it is constituted is a sufficiently good heat conductor for its temperature to be virtually uniform. The sectional plane of the drawing passes through apertures 51 and 31. The stem 8, as well as the screen 6 is made of copper of the quality known as OFHC (oxygen free high conductivity). It projects upwardly into a Dewar flask 9 whose outer wall is the continuation of the tube 7. In this flask there is placed a cooling fluid which may, for example, be melting ice, a mixture of solid carbon dioxide and alcohol or liquid nitrogen. At the level of the outer wall of the flask 9 there is provided a communication between the enclosure 7 containing the screen and disc 1 and the enclosure (not shown but indicated by an arrow) within which the pressure is to be measured.

A description will now be given as to how the pressure is measured: the "thermo-molecular" torque applied to the disc 7 and the acceleration of its rotation (i.e. number of revolutions per second per second (are functions of the pressure *p* which is to be measured and the temperatures T1 and T2 of the hot source 7 and cold source 6.

Simple theoretical considerations permit the following relationship to be established:

$$Y = Kp\left(\sqrt{\frac{T1}{T2}} - 1\right)$$

K is a co-efficient which depends upon the geometry of the device and also on "co-efficients of accommodation" which characterize the changes in quantity of movement due to impacts between the molecules and the surfaces having the various temperatures. In any event, K varies little with pressure, with the nature of the gases and that of the enclosure. In practice K is treated as a constant and this leads to a linear relationship between Y and $p$.

One calibration (i.e., one measurement of Y at a known pressure $p$) is sufficient to determine K. The arrangement then gives absolute measurements of pressure. The range over which the above formula is valid lies between $10^{-3}$ torr (molecular regime) and about $10^{-10}$ torr (limit due to radiation pressure).

The determination of Y is carried out by measuring the variation of the angular speed over intervals of varying length, depending on the pressure which has to be measured. The great sensitivity of this method permits the effective measurement of pressures lower than $10^{-9}$ torr (disturbances due to external vibration have in practice a negligible effect).

In practice measurement is carried out by counting the number of revolutions of the disc 1 during two consecutive periods of the same duration T. For this purpose a lamp 201 (shown in FIGURES 1, 2 and 4 and associated with a lens 202) projects a beam towards the photo-multiplier 203 via an aperture in the outer wall 106 of the electromagnet 100, through the enclosure 7 and finally through the apertures 51 and 31 of the screen. The diameter of this beam is, say, 0.3 mm. In practice it does not modify the movement of the disc 1. This beam is normally intercepted by said disc except twice per revolution when the disc is in the position shown.

At each revolution of the disc 1 the photo-multiplier 203 receives two light pulses and provides two electrical pulses which are shaped in the circuit 204.

If the numbers of pulses occurring in the first and second of said periods are referred to as $n1$ and $n2$, it is easy to show that $$Y = \frac{n2 - n1}{2T^2}$$

It will be seen that the pressure $p$ which is to be measured turns out to be proportional to the difference $n2-n1$. The co-efficient of proportionality depends only on the temperatures T1 and T2 and the duration T and it can be calculated once and for all. It will also be seen that it is not necessary to take into account the speed of rotation of the disc 1 at the beginning of the measurement. This initial speed results generally from the "levitation" of the disc by energizing of the electromagnet 100. Nevertheless if this speed is negative, i.e., in the direction opposite to that of the thermo-molecular couple, it is necessary to wait for it to be stopped before starting the count.

The couning means, which will now be described with reference to FIGURE 4, permit the determination of the difference $n2-n2$ to be rendered automatic.

An electronic counter, which is used as a clock 210 permits the determination of the duration T.

It comprises five outputs (211, 212, 213, 214, 215) at each of which it provides a pulse when a period of duration T has elapsed since the starting of the counting means. This duration T depends on the output and has a length of 33, 100, 333, 1000, 2000 seconds, respectively. This clock is constituted in a conventional manner by a series of electronic flip-flops and is fed by pulses obtained by shaping (in unit 216) of the alternating voltage present at terminal 217 which is connected directly to the supply mains. The first end-of-period pulse which it supplies at the end of period T is received by selector 218, the position of which determines which of the five outputs is used and it is transmitted to the zero resetting terminal 219, which determines the beginning of a new period T. This first pulse is also fed to flip-flops 220 and 221 which are connected in series and which have been reset to zero (like all the other flip-flops of the apparatus) by the application of the supply voltage. The initial state or zero state of these two flip-flops is such that gate 222 (of the AND type) is opened and gate 223 (of the same type) is closed. Thus, during the first period T the pulses from the photo-multiplier 203 reach flip-flop 230. Each of these pulses puts the said flip-flop in such a state that gate 231 (of AND type) is opened and permits multivibrator 232 (which functions continuously at a frequency much greater than that of the rotation of the disc 1) to feed 99 pulses simultaneously to auxiliary register 233 and principal register 234 constituted, like the clock 210, by flip-flops.

When the register 233 has received 99 pulses it opens gate 235, of AND type. The start of the next pulse of the multivibrator 232 then causes bistable circuit 230 to change state, which on the one hand closes immediately gate 231 and prevents said pulse from being passed to said registers, and on the other hand resets to zero the register 233 by acting on its terminal 236. As a result, during said period, each pulse supplied by the photo-multiplier 203 causes the supply of 99 pulses to the register 234. The latter is constituted by two decades, i.e., when it reaches 99 a further pulse will reset it to zero. Algebraically speaking, the 99 positive pulses are equivalent to one negative pulse. For this reason, during the first of said periods (referred to as the counting back period) the pulses from the photo-multiplier 203 are counted negatively in the register 234, which permits the storage of the number $-n1$.

At the end of the counting-back period the first end-of-period pulse places the flip-flop 220 in the "1" state so as to close gate 222 and open gate 223. During the second period of duration T (referred to as the counting period) the pulses of the photo-multiplier 203 are thus fed "positively" into the register 234 through gate 223.

At the end of the counting period the register 234 has thus counted the number $n2-n1$ which is displayed in display means 237. At that instant the clock 210 produces a second end-of-period pulse which resets the gate 220 to the zero state and sets the gate 221 in the "1" state.

This causes first the lighting of lamp 238 (which indicates the end of the measurement), secondly the closing of gate 239 (which stops the operation of the clock 210) and thirdly the simultaneous closing of gates 222 and 223 (which stops the operation of the register 234).

What is claimed is:

1. A device for measuring low gas pressure comprising, in a vessel in which the gas pressure is the one to be measured, an element within said vessel which is rotatable about an axis of symmetry thereof and is located within a cylindrical cold and thick screen constituted of separate parts defining apertures therebetween, said device also comprising at least one hot surface external to said screen, said surface imparting to the gas molecules which strike it a greater velocity after the impact than before and emitting infra-red rays in all directions, said apertures being so oriented that the median plane of the aperture forms with the radial plane passing through the generatrix of the screen and the axis of symmetry a given acute angle, said screen parts comprising windows constituted of a material transparent to infra-red rays, said windows being so orientated that the median plane of said windows forms with the radial plane passing through said generatrix of said cylinder and said axis of symmetry an acute angle having a sign opposite of the first mentioned acute angle, and means responsive to rotation of said element caused by impact of the gas molecules for measuring the pressure of the gas within said vessel.

2. A device as claimed in claim 1 wherein the said screen is thick and has the form of a cylinder coaxial with the axis of rotational symmetry of said movable element, said apertures having the same number $n$ as the said screen parts and the screen having a symmetry of the nth order around the said axis as well as the said source, and wherein the said windows are constituted by parallelopipeds inserted in the said screen, the said axis of symmetry lying on said side of the axis of one of said windows directed from the said source to the said element, and the arrangement of said windows presenting the said nth order of symmetry.

3. A device as claimed in claim 1 in which the said screen is constituted entirely of material transparent to infra-red rays.

4. A device as claimed in claim 1 in which the said screen is constituted of good heat conducting material and is thermally coupled to cooling means.

5. A device as claimed in claim 1 in which the said hot source is constituted by an air-tight enclosure which surrounds the said screen.

6. A device as claimed in claim 1 including means for generating a light beam which is intercepted by said movable element during each of its revolutions, means for transforming the light pulses thus produced into electrical pulses, and means for counting said electrical pulses, the arrangement being characterized in that it comprises also commutating means for feeding said pulses through a first circuit and then through a second circuit to a common counting register during two successive periods of the same duration, said first and second circuits causing inverse counts of the pulses transmitted.

References Cited

UNITED STATES PATENTS 3,196,687   7/1965   Halkowsky _____ 88—14

LOUIS R. PRINCE, *Primary Examiner.*

DONALD O. WOODIEL, *Assistant Examiner.*

UNITED STATES PATENT OFFICE
CERTIFICATE OF CORRECTION

Patent No. 3,357,254            December 12, 1967

Robert Evrard

It is hereby certified that error appears in the above numbered patent requiring correction and that the said Letters Patent should read as corrected below.

Column 3, line 38, for "pasising" read -- passing --; column 4, line 66, for "7" read -- 1 --; column 5, line 56, for "couning" read -- counting --; line 58, for "n2-n2" read -- n2-n1 --.

Signed and sealed this 21st day of January 1969.

(SEAL)
Attest:

Edward M. Fletcher, Jr.            EDWARD J. BRENNER
Attesting Officer            Commissioner of Patents